(No Model.)

W. MANLEY.
CUTTER HEAD FOR BOOTS OR SHOES.

No. 374,416. Patented Dec. 6, 1887.

Witnesses.
W. J. Stewart
W. M. Rebarg, Jr.

Inventor.
William Manley.

UNITED STATES PATENT OFFICE.

WILLIAM MANLEY, OF ROCHESTER, NEW YORK, ASSIGNOR TO JAMES W. BROOKS, TRUSTEE, OF CAMBRIDGE, MASSACHUSETTS.

CUTTER-HEAD FOR BOOTS OR SHOES.

SPECIFICATION forming part of Letters Patent No. 374,416, dated December 6, 1887.

Application filed May 26, 1886. Serial No. 203,330. (No model.)

*To all whom it may concern:*

Be it known that I, WILLIAM MANLEY, of Rochester, in the county of Monroe and State of New York, have invented certain new and useful Improvements in Rotary Trimming-Cutters for Boot or Shoe Heels; and I do hereby declare that the following is a full and exact description thereof, reference being had to the accompanying drawings, making part of this specification.

This invention has for its object to construct a rotary cutter especially adapted for trimming the heels of boots or shoes; and it consists in a spindle and a series of knives carried by it, the said knives being shaped to adapt them for the especial use for which they are designed, combined with an adjusting device for adjusting the knives radially with relation to the axis of the spindle to which they are attached. The adjusting device is herein shown as bearing against the outer ends of the blades or knives, so as to spring the same outward or radially from the spindle, the said device also supporting rigidly the outer ends of the knives. The knives are herein shown as pivotally attached to a disk or ring, preferably having a plain face, the said ring projecting like an annular hub and being secured to the spindle in such manner as to partake of its rotary movement; but instead of the particular disk or ring herein shown I may use any well-known equivalent device.

Figure 1:
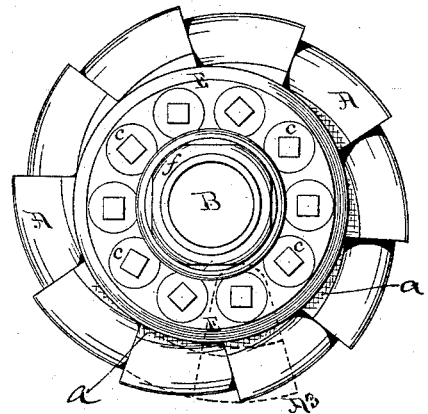
Figure 2:
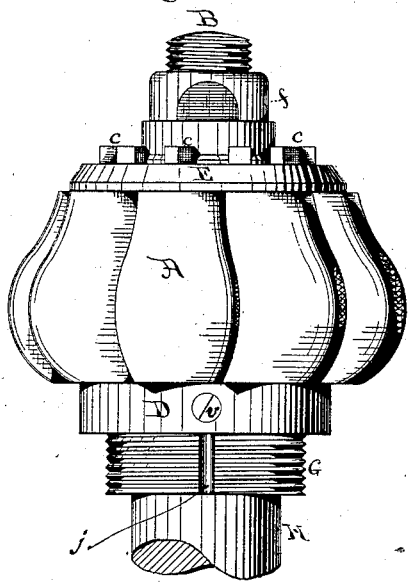
Figure 3:
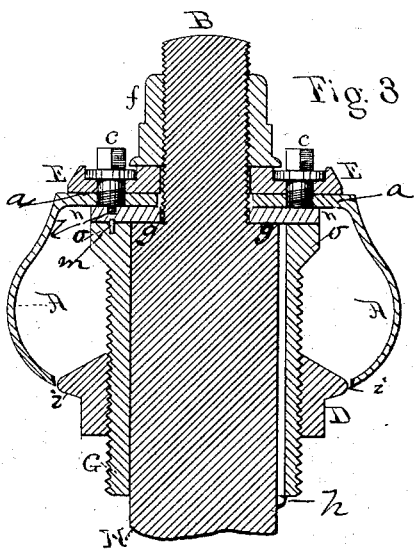

Figure 1 shows an end view of a rotary cutter embodying this invention; Fig. 2, a side view of the same; Fig. 3, a central section of the machine shown in Figs. 1 and 2; and Fig. 4, a view, partially in section and partially in elevation, of the supporting-collar provided with adjusting devices for the cutters.

The knives A A, of suitable shape to adapt them for the use to which they are designed, herein shown as applicable for trimming the heels of boots or shoes, have thick strong shanks *a a*, which extend inward in a plane at right-angles to the spindle B carrying the cutter, the shanks not touching each other when extended radially outward, but adapted to touch each other when sprung around into their extreme lateral position about their pivotal centers *c*. The shanks *a* of the knives are provided each with a hole, through which a screw, *c*, passes, by which to attach the knives to one face of a disk or ring, E. The blades A are secured to the plain face of the disk or ring E, so that their edges may lie in arcs of the same circle, or so that the said edges are in concentric position with relation each to the other, that the said knives may be readily adjusted thereon to different angles about the pivotal screw *c* outside the axis of the spindle, to thereby not only secure correct presentation of the cutting-edges of the knives to the work, but also to give the required clearance between the cutters or for revolving the knives, as indicated by dotted lines, Fig. 3, in which latter position the knives are sometimes brought in order that the cutting-edges thereof may project slightly inward to be acted upon by a revolving grinding or sharpening disk, which is introduced within the series of blades while they are secured to the disk or ring E, the latter at such time being, however, separated from the spindle for the purpose of sharpening several or all of the knives simultaneously.

The attaching-screws *c c* have enlarged disks or heads which, as shown, project outward beyond the square parts, so shaped in order that a wrench may be employed to turn the said screws. The heads referred to are sunk beneath the upper surface of the disk or ring E, so that the nut *f*, which is screwed upon the end of the spindle B to secure the said disk or ring upon it, may project somewhat over the edges of the heads without interfering therewith, and leaving more available room for the screws and for the clamping-nut. The disk or ring E rests on top of the knife-shanks, which in turn rest upon a washer, *n*, (see Fig. 3,) washers of different thickness being used to adjust the cutter to higher or lower heels; but, if desired, the shanks *a* may rest directly upon the shoulder *g* of the spindle. The disk or ring E may be enlarged in diameter, so as to project beyond the cutter-shanks and form a counter-guard; but for machines employing stationary guards the disk or ring must be less in diameter than the body of knives adjacent thereto, as shown in Figs. 2 and 3.

Instead of making the spindle B in one piece, it is preferable to secure a sleeve, G, thereon, the end of the sleeve forming a continuation of the shoulder *g*. This sleeve, secured immovably on the spindle by a key or spline, $h$, Fig. 3, has its outer periphery screw-threaded, as shown, to receive upon it the adjustable collar D for adjusting it up and down. The collar D, as shown in Fig. 3, has a flange, $i$, upon which the free ends of the knives bear when the collar is properly adjusted to the knives, the ends of the knives terminating in flat surfaces or planes at right angles to the axis of the spindle B, so that they may be adjusted on their screw-pivots $c\ c$ without interfering with their support upon the said collar D, the collar thus serving as an adjusting device for moving or swinging the blades radially with relation to the spindle B.

Figure 4:

Instead of a continuous flange, like that shown in Fig. 3, which requires all the knives to be of uniform length, I may use other devices for adjusting them—such, for instance, as the separate screws $b\ b$, shown in Fig. 4, the said screws having conical or sloping heads, as shown, upon which the ends of the respective knives rest, one for each knife. By turning the screws out from or into the collar a firm support may be given separately to each knife, even if the knives differ somewhat in length. These screws or adjusting devices $b$ require to have a fixed relation to their respective knives secured to the spindle, and to insure and determine this the sleeve G has a longitudinal groove, $j$, Fig. 2, in its outer surface, which is entered by a clamp-screw, $v$, inserted through the collar screwed into the groove to hold the collar in fixed position.

In order to correspondingly hold the knives A A in fixed positions, one of the screws $c$ has a downward point or pin, $l$, as on the left side in Fig. 3, which pin enters a hole on the washer $n'$, and a dowel-pin, $m$, on the under side of the said washer fits in a hole in the upper end of the sleeve G. If no washer $n$ is used, then the pin $l$ fits into the hole in the sleeve.

The knives A A are thin and have concave and somewhat complex forms, and to adapt them to the construction of cutter-head above set forth they should be of uniform size and shape.

In another application filed by me July 24, 1886, Serial No. 208,992, a rotary cutter is shown embodying a series of knives and a spindle, and means carried by the spindle whereon the said knives are eccentrically pivoted, and an independent adjusting device for each knife to positively turn them on their pivots, and such construction I do not herein claim.

I claim—

1. In a rotary cutter for trimming boot or shoe heels, the combination, with the knives A A, provided with plane-faced inwardly-turned shanks $a\ a$, each shank having a single screw-threaded hole, and a plane-faced entire disk, E, provided with a series of holes corresponding in number and position with the holes in the cutter-shanks, of pivot-screws $c\ c$, passed, respectively, through the holes in the cutter-shanks, substantially as herein specified, whereby the several knives are held in position for use, and are adapted to have all their cutting-edges turned inward.

2. The combination, in a heel-trimming machine, of the following instrumentalities, viz: knives A A, provided with plane-faced inwardly-turned shanks $a\ a$, each shank having a screw-threaded hole, a plane-faced disk, E, provided with a series of holes corresponding in number and position with the holes in the cutter-shanks, pivot-screws $c\ c$, passed, respectively, through the holes in the disk and screwed into the holes in the cutter-shanks, whereby the knives may be moved so that their edges may be turned inwardly, the shouldered spindle B, upon which the knife-disk is placed, and nut $f$, screwed upon the spindle for clamping the disk to the said spindle, substantially as and for the purpose herein specified.

3. The combination, with the knives A A, disk or ring E, and shouldered spindle B, of the nut $f$ and washer $n$, both coupled to the said disk and spindle, substantially as and for the purpose herein specified.

4. The combination, with the disk or ring E, knives A A, having plane-surfaced lower ends, as set forth, and spindle B, with the adjustable collar D, substantially as and for the purpose herein specified.

5. The combination, with the knives A A, disk or ring E, and spindle B, of collar D, having adjusters $b\ b$, substantially as and for the purpose herein specified.

6. In combination, the knives A A, disk or washer E, spindle B, screw-threaded and longitudinally-grooved sleeve G thereon, collar D, provided with the screw-adjusters $b\ b$, clamp-screw $v$, and means, substantially as described, for securing the said disk or ring E fixedly upon the said sleeve G, substantially as and for the purpose herein specified.

7. In a rotary cutter for trimming the heels of boots or shoes, a series of knives, each having a blade, A, and a shank, $a$, a spindle, and means, substantially as described, carried by and rotating in unison with the spindle, whereon the said knives are pivoted eccentrically to the axis of rotation of the spindle, combined with adjusting devices bearing against the outer end of the blades A to move them radially with relation to the spindle, substantially as described.

WILLIAM MANLEY.

Witnesses:
POMEROY P. DICKINSON,
HOWARD H. WIDENER.